(12) United States Patent
Schmidt et al.

US011952489B2

(10) Patent No.: US 11,952,489 B2
(45) Date of Patent: *Apr. 9, 2024

(54) BIOLOGICALLY DEGRADABLE FILM

(71) Applicant: BIO-TEC BIOLOGISCHE NATURVERPACKUNGEN GMBH & CO. KG, Emmerich (DE)

(72) Inventors: Harald Schmidt, Emmerich (DE); Johannes Mathar, GP's-Heerenberg (NL); Thorsten Roloff, Monheim (DE); Wolfgang Friedek, Bedburg-Hau (DE)

(73) Assignee: BIO-TECH BIOLOGISCHE NATURVERPACKUNGEN GMBH & CO. KG, Emmerich (DE)

( * ) Notice: Subject to any disclaimer, the term of this patent is extended or adjusted under 35 U.S.C. 154(b) by 76 days.

This patent is subject to a terminal disclaimer.

(21) Appl. No.: 16/499,948

(22) PCT Filed: Mar. 26, 2018

(86) PCT No.: PCT/EP2018/057669
§ 371 (c)(1),
(2) Date: Oct. 1, 2019

(87) PCT Pub. No.: WO2018/184897
PCT Pub. Date: Oct. 11, 2018

(65) Prior Publication Data
US 2020/0056037 A1    Feb. 20, 2020

(30) Foreign Application Priority Data

Apr. 5, 2017 (DE) ..................... 10 2017 003 340.4

(51) Int. Cl.
*C08L 67/04* (2006.01)
*C08L 67/02* (2006.01)

(52) U.S. Cl.
CPC ............. *C08L 67/04* (2013.01); *C08L 67/02* (2013.01); *C08L 2203/162* (2013.01); *C08L 2205/02* (2013.01)

(58) Field of Classification Search
CPC .......... C08L 67/00; C08L 67/04; C08L 67/02; C08L 2203/162; C08L 101/16; C08L 2205/02; C08J 2367/02; C08J 2367/04; C08J 2467/04; C08J 5/18
See application file for complete search history.

(56) References Cited

U.S. PATENT DOCUMENTS

| | | | |
|---|---|---|---|
| 5,124,371 A | 6/1992 | Tokiwa et al. | |
| 5,550,173 A | 8/1996 | Hammond et al. | |
| 5,939,467 A * | 8/1999 | Wnuk | A61L 15/62 523/128 |
| 2002/0094444 A1 | 7/2002 | Nakata et al. | |
| 2003/0108701 A1* | 6/2003 | Bond | C08L 67/04 428/35.7 |
| 2003/0124348 A1* | 7/2003 | Arora | D04H 3/02 442/329 |
| 2016/0060451 A1* | 3/2016 | Schmidt | C08L 67/02 524/47 |
| 2016/0257098 A1 | 9/2016 | Nissenbaum et al. | |
| 2018/0345637 A1* | 12/2018 | Hackfort | B32B 7/02 |

FOREIGN PATENT DOCUMENTS

| | | |
|---|---|---|
| CN | 112014000069198 | 8/2016 |
| DE | 202017107113 | 1/2018 |
| EP | 1008629 | 6/2000 |
| EP | 1193294 | 4/2002 |
| EP | 1491585 | 12/2004 |
| JP | 03157450 | 7/1991 |
| JP | 11355913 | 12/1999 |
| JP | 2002047402 | 2/2002 |
| JP | 2004176076 | 6/2004 |
| JP | 2016537495 | 12/2016 |
| JP | 2017222791 | 12/2017 |
| WO | WO2015059709 | 4/2015 |
| WO | WO2016079244 | 5/2016 |

OTHER PUBLICATIONS

McKeen, L.W.; Film Properties of Plastics and Elastomers, 2012, p. 353-378.*
Perstorp; Capa® For spearhead performance, 2010, p. 1-24.*
Vandewijngaarden, J., et al.; Journal of Polymers and the Environment, 2016, p. 104-118.*
Van Leeuwen, A.; Shopping Bag Quantity Assumptions, 2013, p. 1-6.*
Jing, L.; Development of Poly(3-Hydroxybutyrate-co-3-Hydroxyhexanoate)/Polycaprolactone Blend, 2012, p. i-81.*
Khor, H.L. et al.; Materials Science and Engineering Part C, 2002, vol. 20, p. 71-75.*
International Search Report cited in PCT/EP2018/057669 dated Jun. 27, 2018.
Notification of Reasons for Refusal cited in PCT/EP2018/057669 dated Jan. 8, 2021.
CN Office Action cited in 201880020607.2 dated Mar. 8, 2021.

* cited by examiner

*Primary Examiner* — Satya B Sastri
(74) *Attorney, Agent, or Firm* — Workman Nydegger

(57) ABSTRACT

A film is shown and described which contains 10 to 50 wt. % of a component A and 50 to 90 wt. % of a component B, based on the sum of the components A and B,
component A being selected from the group consisting of polymers that are obtainable from ring-opening polymerization and have a glass transition temperature (Tg) lower than −30° C. and
component B being selected from the group consisting of thermoplastic aliphatic copolyesters and mixtures thereof, and the film having a total thickness of 1 to 200 μm.

37 Claims, No Drawings

BIOLOGICALLY DEGRADABLE FILM

The invention relates to a film and to a method for preparation thereof. The invention further relates to the use of a polymer blend for producing a film. The invention also relates to transport bags.

The pollution of the oceans by plastic waste is a problem that has been known for decades and is still unsolved. Plastic is a significant problem in particular for the animals in the sea. The animals get caught in larger pieces of plastic and confuse small pieces of plastic with food, which they cannot digest. Above all, particularly small plastic parts, which are known as microplastics, are absorbed by animals through food and thus also end up in the human food chain.

Many of the pieces of plastic found in the oceans come from plastics carrier bags ("plastic bags"), such as those used in everyday life, for example for shopping. The terms "plastics material/plastics" and "plastic" are used synonymously in the following.

Recycling, sustainable use of plastics products and cleaning up the oceans are approaches that should contribute to reducing the amount of plastic in the oceans. However, the most reliable and most sustainable solution would be to produce plastic products that biodegrade under the natural conditions that exist in the oceans.

The biodegradation of plastics products in natural sea water (salt water) is much more protracted and more problematic than biodegradation in active media such as compost or at higher temperatures, such as those in industrial composting plants. On the one hand, compost has a particularly high concentration of microorganisms involved in degradation. On the other hand, industrial composting plants have precisely controlled conditions (e.g. temperature, oxygen concentration) that ensure optimal biodegradation of the compost. The requirements for plastics products that are biodegradable in the natural conditions of the oceans are thus much higher than for other degradation conditions.

In addition, not only must plastics products have good biodegradability under the natural conditions of the oceans, but they must also have application-specific mechanical properties. For example, transport bags made of plastics material must have sufficient values of tensile strength and elongation at tear to be able to be used as intended in everyday life. Only then can they be considered as a substitute for traditional, non-biodegradable plastic products.

The combination of (a) good biodegradability of a plastics film in seawater on the one hand and (b) good mechanical properties of a plastics film on the other hand turns out to be extremely difficult in practice. Previous attempts to reconcile these two seemingly contradictory properties of a film were only partially successful.

EP 2 913 362 A1 describes a film comprising polyhydroxyalkanoates and polylactides which has improved biodegradation in an environment with microorganisms and at the same time has good storage stability, strength and flexibility. However, biodegradation is not optimized for the particularly demanding degradation conditions in natural seawater.

EP 1 008 629 A1 describes a biodegradable polyester resin comprising 100 parts by weight of an aliphatic polyester resin and 1-200 parts by weight of polycaprolactone. From this polymer mixture, a variety of different, biodegradable products can be produced. However, the biodegradability is not adapted to the particularly demanding degradation conditions in natural seawater.

None of the films described solves the problem of the particular challenge of biodegradation in seawater whilst simultaneously having satisfactory mechanical properties.

Proceeding from the prior art described above, the object of the invention is to provide a film which has a very good biodegradability in seawater and at the same time has excellent mechanical properties. Preferably, the film is intended to decompose into smaller particles after its introduction into seawater, simultaneously with, before or after the onset of biodegradation of the film(s) to form carbon dioxide and water. The invention also aims to provide a film which is particularly suitable for the production of transport bags.

These objects are achieved in whole or in part by the film specified in claim 1, the use specified in claim 27, the product specified in claim 30 and the method specified in claim 33.

Advantageous embodiments of the invention are specified in the dependent claims and are explained in detail below, as is the general inventive concept.

The film of the invention is characterized in that it contains 10 to 50 wt. % of a component A and 50 to 90 wt. % of a component B, based on the sum of components A and B, component A being selected from the group consisting of polymers that are obtainable from ring-opening polymerization and have a glass transition temperature (Tg) lower than −30° C., and component B being selected from the group consisting of thermoplastic aliphatic copolyesters and mixtures thereof, the film having a total thickness of 1 to 200 µm.

Surprisingly, it has been found that the films according to the invention have both outstanding mechanical properties such as high tensile strength and/or high elongation at tear and very good biodegradability in natural seawater.

Without wishing to be bound by any scientific theory, the surprising effect of the invention appears to be due to the particular properties of the combination of components A and B. Extensive experimental studies were required to find suitable components and ratios for components A and B. When polymers other than those defined for components A and B were combined, either the films produced therefrom lacked mechanical properties or the biodegradability of the film in seawater was insufficient. Furthermore, it is indispensable for the biodegradability in seawater and the mechanical properties of the films that the correct ratio of components A and B is selected.

Preferably, the film has at least one of the following mechanical properties:
- tensile strength in the dry state in the extrusion direction (MD) of at least 15 MPa according to EN ISO 527;
- tensile strength in the dry state transversely to the extrusion direction (TD) of at least 15 MPa according to EN ISO 527;
- elongation at tear in the dry state in the extrusion direction (MD) of at least 100% according to EN ISO 527;
- elongation at tear in the dry state transversely to the extrusion direction (TD) of at least 100% according to EN ISO 527.

The above-mentioned mechanical properties are preferably determined in accordance with EN ISO 527-3:2003-07.

Advantageously, after introduction into salt water for a period of 12 weeks under controlled test conditions, according to the ASTM D6691-09 method, and after sieving through a sieve having a mesh size of 2.0 mm, the film has a maximum of 30 wt. % of the original dry weight, and/or at least 30% of the organic carbon of the film is, after introduction into salt water, converted into carbon dioxide within 180 days at a temperature of 30±2° C., according to the method ASTM D6691-09.

The measurement of the degradation in salt water under controlled test conditions according to ASTM D6691-09 is preferably carried out on films having a thickness of 1 to 100 μm, in particular 10 to 40 μm, more preferably having a thickness of approximately 20 μm.

According to a preferred embodiment, the film contains 10 to 50 wt. % of a component A and 50 to 90 wt. % of a component B, based on the sum of components A and B, component A being selected from the group consisting of polymers that are obtainable from ring-opening polymerization and have a glass transition temperature (Tg) lower than −30° C., and component B being selected from the group consisting of thermoplastic aliphatic copolyesters and mixtures thereof, the film having a total thickness of 1 to 200 μm and at least one of the following mechanical properties:

tensile strength in the dry state in the extrusion direction (MD) of at least 15 MPa according to EN ISO 527;
tensile strength in the dry state transversely to the extrusion direction (TD) of at least 15 MPa according to EN ISO 527;
elongation at tear in the dry state in the extrusion direction (MD) of at least 100% according to EN ISO 527;
elongation at tear in the dry state transversely to the extrusion direction (TD) of at least 100% according to EN ISO 527;

and the film having a maximum of 30 wt. % of the original dry weight after introduction into salt water for a period of 12 weeks under controlled test conditions, according to the method ASTM D6691-09, and after sieving through a sieve having a mesh size of 2.0 mm, and/or at least 30% of the organic carbon of the film being converted to carbon dioxide within 180 days at a temperature of 30±2° C., according to the method ASTM D6691-09, after introduction into salt water.

The film according to the invention contains a component A which is selected from the group consisting of polymers that are obtainable from ring-opening polymerization and have a glass transition temperature (Tg) lower than −30° C.

Methods for determining the glass transition temperature are known to a person skilled in the art. For example, the glass transition temperature can be determined by means of Differential Scanning calorimetry (DSC). If a polymer sample is subjected to a defined heating/cooling program, the glass transition temperature can be recognized as a step in the DSC diagram.

For the measurement, a temperature program consisting of a heating-cooling-heating cycle is usually used. In this temperature program, the sample can first be equilibrated at a pre-set starting temperature for 2 to 5 min. After this first equilibration phase, the sample is heated at a constant heating rate to a preset first target temperature. Usually, a heating rate of 10° C./min is used. At the first target temperature, the sample may be equilibrated again for 2 to 5 min and then cooled at a constant cooling rate to a preset second target temperature. Usually, a cooling rate of 10° C./min is used. At the second target temperature, the sample may be equilibrated again for 2 to 5 min and then heated at a constant heating rate to a preset third target temperature at which the sample can be kept constant for 2 to 5 min before the measurement is ended. Usually, the same heating rate is used as in the first heating phase, for example 10° C./min. The first and third target temperatures may be the same or different, and the starting and second target temperatures may also be the same or different.

In particular the mid-point temperature $T_{mg}$ of the stage of the second heating step in the DSC diagram is given as the glass transition temperature, wherein the measurement was carried out at heating and cooling rates of 10° C./min in each case and with an equilibration time at the temperature end points of 2 minutes in each case. The mid-point temperature $T_{mg}$ is defined, for example, in the textbook "Praxis der Thermischen Analyse von Kunststoffen" ("Thermal analysis of plastics: theory and practice") by Gottfried W. Ehrenstein, Gabriela Riedel, Pia Trawiel, 2nd edition, Carl Hanser Verlag, Munich 2003, page 9.

When polymers that are obtainable from ring-opening polymerization are mentioned here or elsewhere, this is intended to mean polymers in which the chain polymerization of a cyclic monomer leads to the polymer. The cyclic monomer may preferably be a cyclic ester, a cyclic ether, a cyclic amide and/or a cyclic alkene. The chain polymerization of the monomer may preferably be carried out catalytically and/or thermally. A catalyst for the ring-opening polymerization may be an alcohol and/or a diol.

Preferably, component A has a glass transition temperature (Tg) lower than −40° C., more preferably lower than −50° C., particularly preferably lower than −55° C. According to a further advantageous embodiment of the invention, component A is a polyester. If component A is a polyester, it may preferably be obtained by ring-opening polymerization of a cyclic ester, i.e. of a lactone.

According to a particularly advantageous embodiment of the invention, polycaprolactone is used as component A. When polycaprolactone is mentioned here or elsewhere, this is intended in particular to mean poly-ε-caprolactone. Poly-ε-caprolactone is obtainable by ring-opening polymerization of ε-caprolactone.

According to a preferred embodiment of the invention, component A has a number-average molecular weight MW of 60,000 to 120,000 g/mol, preferably from 70,000 g/mol to 90,000 g/mol.

In addition to component A, the film contains at least one further component B. According to the invention, component B is selected from the group consisting of thermoplastic aliphatic copolyesters and mixtures thereof.

According to a preferred embodiment of the invention, the number of carbon atoms n per monomer unit of the thermoplastic aliphatic copolyester of component B is 4 to 10. Thermoplastic aliphatic copolyesters having a number n of carbon atoms per monomer unit of 4 to 8, more preferably 4 to 6, are particularly preferred.

According to a further preferred embodiment of the invention, component B is selected from the group of polyesters consisting of poly(3-hydroxybutyrate-co-3-hydroxyvalerate) (PHBV), poly(3-hydroxybutyrate-co-3-hexanoate) (PHBH), polybutylene succinate (PBS), poly(butylene adipate-co-succinate) (PBSA), and mixtures thereof. Poly(3-hydroxybutyrate-co-3-hexanoate) and/or poly(butylene adipate-co-succinate) is particularly preferably used as component B.

In a further preferred embodiment of the invention, component B consists of a thermoplastic, aliphatic polyester.

In another preferred embodiment of the invention, component B consists of several different thermoplastic aliphatic polyesters, in particular of two or three different thermoplastic aliphatic polyesters.

Particularly good results are obtained if the poly(3-hydroxybutyrate-co-3-hexanoate) used as component B has a molar proportion of 3-hydroxyhexanoate of 5 to 15 mol. %, preferably 7 to 13 mol. % or 10 to 13 mol. %, in each case based on the total amount of PHBH.

Advantageously, the aliphatic copolyester according to component B has a number-average molecular weight MW of 70,000 to 1,500,000 g/mol, preferably from 90,000 to 1,000,000 g/mol, more preferably from 100,000 to 800,000 g/mol, even more preferably from 100,000 to 700,000 g/mol, still more preferably from 100,000 to 600,000 g/mol.

In a preferred embodiment of the invention in which poly(3-hydroxybutyrate-co-hexanoate) is a partial constituent or the only constituent of component B of the film according to the invention, the poly(3-hydroxybutyrate-co-hexanoate) preferably has a number-average molecular weight of 100,000 to 1,500,000 g/mol, preferably from 200,000 to 1,000,000 g/mol, more preferably from 300,000 to 800,000 g/mol, particularly preferably from 400,000 to 700,000 g/mol, very particularly preferably from 500,000 to 600,000 g/mol.

In a preferred embodiment of the invention in which poly(butylene adipate-co-succinate) is a partial constituent or the only constituent of component B of the film according to the invention, the poly(butylene adipate-co-succinate) preferably has a number-average molecular weight of 50,000 to 500,000 g/mol, more preferably from 70,000 to 400,000 g/mol, particularly preferably from 90,000 to 300,000 g/mol, very particularly preferably from 100,000 to 200,000 g/mol.

The film according to the invention may contain further polymeric components in addition to components A and B. In particular, in addition to the components A and B, the film according to the invention may comprise poly(butylene adipate-co-terephthalate) (PBAT) or poly(butylene sebacate-co-terephthalate) (PBST) or mixtures thereof.

According to one embodiment, the film comprises 0.1 to 30 wt. %, preferably 1 to 25 wt. %, more preferably 3 to 20 wt. %, even more preferably 4 to 15 wt. %, particularly preferably 5 to 12 wt. %, poly(butylene adipate-co-terephthalate) and/or poly(butylene sebacate-co-terephthalate) (PBST). According to a further embodiment, the film comprises 15 to 25 wt. %, preferably 17 to 23 wt. %, particularly preferably 18 to 22 wt. %, poly(butylene adipate-co-terephthalate) and/or poly(butylene sebacate-co-terephthalate) (PBST).

As a further constituent, the film according to the invention may contain 0.1 to 20 wt. %, preferably 2 to 18 wt. %, more preferably 5 to 15 wt. %, particularly preferably 8 to 12 wt. %, starch.

Thermoplastic starch, denatured starch and/or starch derivatives, inter alia, can be used as starch according to the invention. Preferably, thermoplastic starch can be used.

For many applications, it is advantageous if the film has a total thickness of from 5 to 200 µm, preferably from 10 to 80 µm, particularly preferably from 15 to 60 µm. The film is suitable in different thicknesses for the production of different products. Films in the thicknesses mentioned are particularly suitable for the production of carrier bags and transport bags for everyday use.

The mechanical properties and the biodegradability of the film according to the invention are primarily determined by the ratio of components A and B.

The film according to the invention contains 10 to 50 wt. % of a component A, based on the sum of the components A and B. According to a preferred embodiment of the invention, the film contains 20 to 40 wt. %, preferably 25 to 40 wt. %, more preferably 25 to 35 wt. % and particularly preferably 28 to 32 wt. %, of component A, based on the sum of components A and B.

The film according to the invention contains 50 to 90 wt. % of a component B, based on the sum of the components A and B. In a preferred embodiment of the invention, the film contains 60 to 80 wt. %, preferably 60 to 75 wt. %, more preferably 65 to 75 wt. % and particularly preferably 68 to 72 wt. %, of component B, based on the sum of components A and B.

When a component B is mentioned here or elsewhere, this component B may consist of one compound and/or a plurality of compounds. In a preferred embodiment of the invention, component B consists of a single compound. In a further preferred embodiment of the invention, the component B consists of a plurality of different compounds, in particular of two or three different compounds.

The film according to the invention is characterized by excellent mechanical properties, which allows the use thereof in transport bags.

The film according to the invention therefore preferably has an elongation at tear in the extrusion direction (MD, machine direction), according to EN ISO 527, of at least 100% in the dry state. In a preferred embodiment of the invention, the elongation at tear in the extrusion direction (MD), according to EN ISO 527, is at least 150%, preferably at least 200%, more preferably at least 300%, particularly preferably at least 400%.

Furthermore, the film according to the invention preferably has an elongation at tear transversely to the direction of extrusion (TD, transverse direction), according to EN ISO 527, of at least 100% in the dry state. In a preferred embodiment of the invention, the elongation at tear transversely to the extrusion direction (TD), according to EN ISO 527, is at least 150%, preferably at least 200%, more preferably at least 300%, particularly preferably at least 400%.

In addition, the film according to the invention preferably has a tensile strength in the extrusion direction (MD) of at least 15 MPa, according to EN ISO 527, in the dry state. According to a preferred embodiment of the invention, the tensile strength in the direction of extrusion (MD) of the film is at least 20 MPa, preferably at least 25 MPa, particularly preferably at least 30 MPa, in the dry state.

In addition, the film according to the invention preferably has a tensile strength transversely to the extrusion direction (TD) of at least 15 MPa, according to EN ISO 527, in the dry state. According to a preferred embodiment of the invention, the tensile strength transversely to the direction of extrusion (TD) of the film is at least 20 MPa, preferably at least 25 MPa, particularly preferably at least 30 MPa, in the dry state.

Advantageously, the film has a dart drop value in the dry state of at least 4 g/µm, preferably of at least 5 g/µm, particularly preferably of at least 6 g/µm, according to the method ASTM D1709.

The film according to the invention is characterized not only by the excellent mechanical properties but also by very good biodegradability and rapid decomposition in salt water.

Therefore, after introduction into salt water for a period of 12 weeks under controlled test conditions, according to the method ASTM D6691-09, and after sieving through a sieve having a mesh size of 2.0 mm, the film according to the invention preferably has a maximum of 30 wt. % of the original dry weight.

In a preferred embodiment of the invention, after introduction into salt water for a period of 12 weeks under controlled test conditions, according to the method ASTM D6691-09, and after sieving through a sieve having a mesh size of 2.0 mm, the film has a maximum of 20 wt. %, preferably a maximum of 10 wt. %, of the original dry weight.

The term salt water refers here to a natural seawater medium according to point 7.5.2 of the method ASTM D6691-09.

When the method ASTM D6691-09 is mentioned here or elsewhere, this is intended to mean the version issued on 15 Nov. 2009 having the title *"Standard Test Method for Determining Aerobic Biodegradation of Plastic Materials in the Marine Environment by a Defined Microbial Consortium or Natural Sea Water Inoculum."*

The film according to the invention has excellent biodegradability in salt water. At least 30% of the organic carbon of the film according to the invention is preferably converted to carbon dioxide within 180 days at a temperature of 30±2° C., according to the method ASTM D6691-09, after introduction of the film into salt water.

In a preferred embodiment of the invention, after introduction of the film into salt water for 180 days at a temperature of 30±2° C. under controlled test conditions, according to the method ASTM D6691-09, preferably at least 40%, particularly preferably at least 50%, of the organic carbon of the film is converted to carbon dioxide. The term salt water refers here to a natural seawater medium according to point 7.5.2 of the method ASTM D6691-09.

The biodegradation of the film according to the invention is exceptionally effective not only in the natural conditions of seawater. In a preferred embodiment of the invention, preferably at least 70%, more preferably at least 80%, particularly preferably at least 90%, of the organic carbon of the film is converted to carbon dioxide within 180 days in active degradation conditions according to the method DIN EN ISO 14855-1:2012.

The biological degradation of the film in seawater usually takes place in two steps, which begin either simultaneously or at different times. On the one hand, the film according to the invention decomposes in seawater into smaller parts ("fragmentation"). On the other hand, the plastic parts are biodegraded at the molecular level by being converted by microorganisms to carbon dioxide and water ("biodegradation"). Frequently, but not necessarily, the "fragmentation" step begins before the "biodegradation" step.

The film according to the invention may be formed as a single-layer or multi-layer film. The film according to the invention is preferably designed as a single-layer film, since a single-layer film can be produced in a particularly simple and cost-effective manner and can be further processed to form transport bags. However, it is also possible for the film according to the invention to comprise one or more identical or different additional layers. The individual layers of a multi-layer film may, for example, differ from one another in terms of their composition and their thickness.

The film according to the invention may contain, in addition to the constituents mentioned, further constituents.

The film according to the invention may further contain, for example, plasticizers. Examples of plasticizers are glycerol, sorbitol, arabinose, lycose, xylose, glucose, fructose, mannose, allose, altrose, galactose, gulose, iodose, inositol, sorbose, talitol and monoethoxylate, monopropoxylate and monoacetate derivatives thereof, and ethylene, ethylene glycol, propylene glycol, ethylene diglycol, propylene diglycol, ethylene triglycol, propylene triglycol, polyethylene glycol, polypropylene glycol, 1,2-propanediol, 1,3-propanediol, 1,2-, 1,3-, 1,4-butanediol, 1,5-pentanediol, 1,6-, 1,5-hexanediol, 1,2,6-, 1,3,5-hexanetriol, neopentyl glycol, trimethylopropane, pentaerythritol, sorbitol and the acetate, ethoxylate and propoxylate derivatives and mixtures thereof.

Preferably, the film according to the invention is free of oligomeric ester compounds having a weight-average molecular weight of 500 to 5000 g/mol, in particular poly(1,3-butylene glycol-co-1,2-propylene glycol adipic acid) terminated with 2-ethylhexanol, poly(neopentylglycol-co-1,4-butylene glycol adipic acid) terminated with 2-ethylhexanol, poly(1,3-butylene glycol adipic acid) non-terminated, poly(1,2-propylene glycol adipic acid-co-phthalic acid) terminated with 2-ethylhexanol, poly(neopentyl glycol adipic acid) terminated with 2-ethylhexanol, poly(1,2-propylene glycol adipic acid-co-phthalic acid) terminated with 2-ethylhexanol, poly(1,3-butylene glycol adipic acid) terminated with mixed fatty acids, poly(1,2-propylene glycol adipic acid) terminated with 2-ethylhexanol, poly(1,2-propylene glycol-co-1,4-butylene glycol adipic acid) terminated with 2-ethylhexanol, poly(1,4-butylene glycol adipic acid) or poly(1,4-butylene glycol-co-ethylene glycol adipic acid), each having a weight-average molecular weight of 500 to 5000 g/mol.

Furthermore, the film according to the invention may contain dispersing aids such as detergents, melt stabilizers, processing aids, stabilizers, antioxidants, flame retardants, anti-blocking agents, fillers and/or additives.

In addition, the film according to the invention may additionally contain other polymers such as, for example, polyethylene glycol, polyvinyl alcohol, chitin, chitosan, cellulose, cellulose derivatives, polyesters, polydimethylaminoethyl methacrylate, and mixtures thereof.

According to a further preferred embodiment of the invention, the film according to the invention contains one or more fillers and/or one or more disintegrants. Depending on the type and amount of filler and/or disintegrant, the rate of disintegration of the film according to the invention can be influenced.

Preferred fillers for this purpose are selected from the group consisting of calcium carbonate, talc, kaolin, dolomite, mica, silicic acid, and mixtures thereof.

Disintegrants are known to a person skilled in the art. Preferred disintegrants for this purpose are selected from the group consisting of sodium hydrogen-carbonate, alginic acid, calcium alginate, sodium alginate, microcrystalline cellulose, sodium carboxymethyl cellulose, starch, sodium carboxymethyl starch, polyvinyl pyrrolidone, and mixtures thereof. Starch can be native or destructured.

The invention further relates to the use of a polymer blend containing component A and component B for producing a film having a total thickness of from 1 to 200 μm and at least one of the following mechanical properties:

tensile strength in the dry state in the extrusion direction (MD) of at least 15 MPa according to EN ISO 527;

tensile strength in the dry state transversely to the extrusion direction (TD) of at least 15 MPa according to EN ISO 527;

elongation at tear in the dry state in the extrusion direction (MD) of at least 100% according to EN ISO 527;

elongation at tear in the dry state transversely to the extrusion direction (TD) of at least 100% according to EN ISO 527;

and the film having a maximum of 30 wt. % of the original dry weight after introduction into salt water for a period of 12 weeks under controlled test conditions, according to the method ASTM D6691-09, and after sieving through a sieve having a mesh size of 2.0 mm, and/or at least 30% of the organic carbon of the film being converted to carbon dioxide within 180 days at a temperature of 30±2° C., according to the method ASTM D6691-09, after introduction into salt water.

The statements made with regard to components A and B of the film according to the invention apply to components A and B, respectively, of the use according to the invention. Furthermore, the polymer blend may contain one or more of the above-mentioned constituents.

The polymer blend preferably contains 10 to 50 wt. %, in particular 20 to 40 wt. %, 25 to 40 wt. %, 25 to 35 wt. % or 28 to 32 wt. %, of component A, based on the sum of the components A and B. Furthermore, the polymer blend preferably contains 50 to 90 wt. %, in particular 60 to 80 wt. %, 60 to 75 wt. %, 65 to 75 wt. % or 68 to 72 wt. %, of component B, based on the sum of the components A and B.

The invention also relates to products which are or can be produced using the film according to the invention.

Transport bags which are or can be produced from the film according to the invention are of particular significance. The films according to the invention are suitable for the production of transport bags of any kind, including carrier bags, fruit bags, vegetable bags, light T-shirt bags and ultra-light T-shirt bags.

The different types of transport bags may have a different weight depending on the application. In a preferred embodiment of the invention, a transport bag according to the invention, for example, has a weight of preferably 1 to 90 g, more preferably 2 to 50 g or particularly preferably 20 to 40 g. Transport bags according to the invention which have a weight of preferably 1 to 10 g, more preferably 1.5 to 5 g, are particularly suitable for other applications.

Finally, the invention also relates to a method for producing a film. The process according to the invention for producing a film comprises at least the following steps:

a. providing a polymer blend containing component A and component B;

b. forming a film from the polymer blend according to step a.

Suitable methods for forming a film according to step b. are well known to a person skilled in the art and typically include an extrusion step (in particular a coextrusion step) and/or a lamination step.

The statements made with regard to components A and B of the film according to the invention apply to components A and B, respectively, of the method according to the invention. Furthermore, the polymer blend may contain one or more of the above-mentioned constituents.

The polymer blend preferably contains 10 to 50 wt. %, in particular 20 to 40 wt. %, 25 to 40 wt. %, 25 to 35 wt. % or 28 to 32 wt. %, of component A, based on the sum of the components A and B. Furthermore, the polymer blend preferably contains 50 to 90 wt. %, in particular 60 to 80 wt. %, 60 to 75 wt. %, 65 to 75 wt. % or 68 to 72 wt. %, of component B, based on the sum of the components A and B.

The invention is explained in greater detail in the following with reference to practical examples.

EXAMPLES

The following materials were used for the comparative and practical examples: poly(butylene succinate-co-adipate), PBSA (BioPBS FD92PM, PTT MCC Biochem Company Limited); polycaprolactone, PCL (Capa 6800, Perstorp); poly(hydroxybutyrate-co-hexanoate), PHBH (AONILEX 151N, KANEKA); erucic acid amide (LOXIOL E SPEZ P, Emery Oleochemicals).

Example 1

Using a twin screw extruder of the type Coperion ZSK 40 (twin-screw compounder), screw diameter 40 mm, L/D=42, a polymer blend was prepared with the formulation A given in Table 1 and processed to form a granulate (metered proportions in mass percentage):

TABLE 1

| Formulation A | |
|---|---|
| Compound | Amount |
| PCL | 29.7 |
| PBSA | 69.3 |
| Loxiol | 1 |

The following compounding parameters were observed:

TABLE 2

| Temperature profile (twin screw extruder ZSK 40) | | | | | | | | | | |
|---|---|---|---|---|---|---|---|---|---|---|
| Zone 1 | Zone 2 | Zone 3 | Zone 4 | Zone 5 | Zone 6 | Zone 7 | Zone 8 | Zone 9 | Zone 10 | Nozzle |
| 25° C. | 100° C. | 110° C. | 115° C. | 130° C. | 145° C. | 160° C. | 160° C. | 160° C. | 160° C. | 160° C. |

Speed 100 min$^{-1}$
Flow rate 50 kg/h
Degassing −0.96 bar, zone 8
Water content 0.07%

Blown films were produced from the granulate produced. For this purpose, the granulate A was melted using a single-screw extruder of the type KABRA, screw diameter 65 mm, L/D=23, and processed to form a blown film.

In order to investigate the durability of the film in water, samples of the film were clamped in slide frames and placed in natural seawater. The decomposition of the film was examined visually. Table 3 documents the relative decomposition of the film over a period of 72 days in seawater.

TABLE 3

Relative decomposition of the film obtainable from granulate A

| Days | Decomposition |
|------|---------------|
| 0    | 1             |
| 22   | (3)-4         |
| 37   | 4             |
| 72   | 4             |

Legend:
Value Meaning
1 Foil intact
2 Decomposition visible
3 Decomposition advanced
4 Film completely decomposed In addition, the mechanical properties of the film were checked. The tensile strength and elongation at tear were measured on a Tinius Olsen universal testing machine H10KS. In order to determine the film thickness, the precision thickness gauging device DM 2000 from Wolf-Messtechnik was used. The results of the measurements are listed in Table 4.

TABLE 4

Mechanical properties of the film

| Film thickness [μm] | Tensile strength (MD) [MPa] | Tensile strength (TD) [MPa] | Elongation at tear (MD) [%] | Elongation at tear (TD) [%] |
|---|---|---|---|---|
| 12-27 | 34 | 30.1 | 677 | 878 |

As can be seen from Tables 3 and 4, the film has excellent mechanical properties for use as a transport bag and extremely rapid decomposition in seawater. Already after approximately a month in seawater, the film decomposed almost completely (Table 3, line 2).

Example 2

Using a twin screw extruder of the type Coperion ZSK 40 (twin-screw compounder), screw diameter 40 mm, L/D=42, a polymer blend was prepared with the formulation B given in Table 5 and processed to form a granulate (metered proportions in mass percentage):

TABLE 5

| Formulation B | |
|---|---|
| Compound | Amount |
| PCL | 29.7 |
| PHBH | 69.3 |
| Loxiol | 1 |

The following compounding parameters were observed:

TABLE 6

| Temperature profile (twin screw extruder ZSK 40) | | | | | | | | | | |
|---|---|---|---|---|---|---|---|---|---|---|
| Zone 1 | Zone 2 | Zone 3 | Zone 4 | Zone 5 | Zone 6 | Zone 7 | Zone 8 | Zone 9 | Zone 10 | Nozzle |
| 25° C. | 100° C. | 110° C. | 115° C. | 130° C. | 145° C. | 160° C. | 160° C. | 160° C. | 160° C. | 160° C. |

Speed 100 min$^{-1}$
Flow rate 50 kg/h
Degassing −0.98 bar, zone 8
Water content 0.13%

Blown films were produced from the granulate produced. For this purpose, the granulate B was melted using a single-screw extruder of the type KABRA, screw diameter 65 mm, L/D=23, and processed into a blown film.

The mechanical properties of the film were checked. The measurement was carried out using the same apparatuses as in Example 1. The results of the measurement are listed in Table 7.

TABLE 7

| Mechanical properties of the film | | | | |
|---|---|---|---|---|
| Film thickness [μm] | Tensile strength (MD) [MPa] | Tensile strength (TD) [MPa] | Elongation at tear (MD) [%] | Elongation at tear (TD) [%] |
| 41-60 | 32.6 | 28.9 | 714 | 669 |

As can be seen from Table 7, the film has excellent mechanical properties for use as a transport bag.

Example 3

Using a twin screw extruder of the type Coperion ZSK 40 (twin-screw compounder), screw diameter 40 mm, L/D=42, a polymer blend was prepared with the formulation C given in Table 8 and processed to form a granulate (metered proportions in mass percentage):

TABLE 8

| Formulation C | |
|---|---|
| Compound | Amount |
| PCL | 19.8 |
| PHBH | 19.8 |
| PBSA | 59.4 |
| Loxiol | 1 |

The following compounding parameters were observed:

TABLE 9

| Temperature profile (twin screw extruder ZSK 40) | | | | | | | | | | |
|---|---|---|---|---|---|---|---|---|---|---|
| Zone 1 | Zone 2 | Zone 3 | Zone 4 | Zone 5 | Zone 6 | Zone 7 | Zone 8 | Zone 9 | Zone 10 | Nozzle |
| 25° C. | 100° C. | 110° C. | 115° C. | 130° C. | 145° C. | 160° C. | 160° C. | 160° C. | 160° C. | 160° C. |

Speed 100 min$^{-1}$
Flow rate 50 kg/h
Degassing −0.98 bar, zone 8
Water content 0.07%

Blown films were produced from the granulate produced. For this purpose, the granulate C was melted using a single-screw extruder of the type Collin 30 (DR. COLLIN), screw diameter 30 mm, L/D=33, and processed to form a blown film.

The mechanical properties of the film were checked. The measurement was carried out using the same apparatuses as in Example 1. The results of the measurement are listed in Table 10.

TABLE 10

| Mechanical properties of the film | | | | |
|---|---|---|---|---|
| Film thickness [μm] | Tensile strength (MD) [MPa] | Tensile strength (TD) [MPa] | Elongation at tear (MD) [%] | Elongation at tear (TD) [%] |
| 23-35 | 41.2 | 39.5 | 690 | 866 |

As can be seen from Table 10, the film has excellent mechanical properties for use as a transport bag.

The invention claimed is:

1. A single-layer film, wherein the single-layer film comprises:
    10 to 50 wt. % of a component A and 50 to 90 wt. % of a component B, based on the sum of the components A and B,
    wherein component A is selected from the group consisting of polymers that are obtainable from ring-opening polymerization and have a glass transition temperature (Tg) lower than −30° C.,
    wherein component B is selected from the group consisting of thermoplastic aliphatic copolyesters and mixtures thereof,
    wherein the film has a total thickness of 1 to 200 μm, and wherein the film is free of starch,
    wherein
        the component B is selected from the group consisting of poly(3-hydroxybutyrate-co-3-hydroxyvalerate), poly(3-hydroxybutyrate-co-3-hexanoate), poly(butylene adipate-co-succinate), and mixtures thereof, the poly(butylene adipate-co-succinate) having a number-average molecular weight of 50,000 to 500,000 g/mol; and
    wherein
        the film comprises 0.1 to 30 wt. % poly(butylene adipate-co-terephthalate), based on the total weight; or
        the film comprises 0.1 to 30 wt. % poly(butylene sebacate-co-terephthalate), based on the total weight.

2. The film according to claim 1, wherein the film has at least one of the following mechanical properties:
    a tensile strength in the dry state in the extrusion direction (MD) of at least 15 MPa according to EN ISO 527;
    a tensile strength in the dry state transversely to the extrusion direction (TD) of at least 15 MPa according to EN ISO 527;
    an elongation at tear in the dry state in the extrusion direction (MD) of at least 100% according to EN ISO 527; or
    an elongation at tear in the dry state transversely to the extrusion direction (TD) of at least 100% according to EN ISO 527.

3. The film according to claim 1, wherein after introduction into salt water for a period of 12 weeks under controlled test conditions, according to the method ASTM D6691-09, and after sieving through a sieve having a mesh size of 2.0 mm, the film has a maximum of 30 wt. % of the original dry weight, and/or wherein after introduction into salt water, at least 30% of the organic carbon of the film is converted to carbon dioxide within 180 days at a temperature of 30±2° C., according to the method ASTM D6691-09.

4. The film according to claim 1, wherein the component A has a glass transition temperature (Tg) lower than −40° C.

5. The film according to claim 4, wherein the component A is a polyester.

6. The film according to claim 5, wherein the component A is polycaprolactone.

7. The film according to claim 4, wherein the component A has a number-average molecular weight of from 60,000 to 120,000 g/mol.

8. The film according to claim 1, wherein the component B is poly(3-hydroxybutyrate-co-3-hydroxyvalerate), and/or poly(butylene adipate-co-succinate).

9. The film according to claim 8, wherein the component B is poly(butylene adipate-co-succinate).

10. The film according to claim 1,
    wherein the component B includes poly(3-hydroxybutyrate-co-3-hydroxyvalerate) and/or poly(3-hydroxybutyrate-co-3-hexanoate) having a number-average molecular weight of 70,000 to 1,500,000 g/mol.

11. The film according to claim 1, wherein the component B is poly(3-hydroxybutyrate-co-3-hexanoate), and the poly (3-hydroxybutyrate-co-3-hexanoate) has a number-average molecular weight of 300,000 to 800,000 g/mol.

12. The film according to claim 8, wherein the component B includes the poly(butylene adipate-co-succinate) having the number-average molecular weight of 50,000 to 500,000 g/mol.

13. The film according to claim 1, wherein the film comprises 0.1 to 30 wt. % poly(butylene adipate-co-terephthalate), based on the total weight.

14. The film according to claim 1, wherein the film comprises 0.1 to 30 wt. % poly(butylene sebacate-co-terephthalate), based on the total weight.

15. The film according to claim 1, wherein the film has a total thickness of 5 to 200 μm.

16. The film according to claim 1, wherein the film comprises 20 to 40 wt. % of component A, based on the sum of components A and B.

17. The film according to claim 1, wherein the film comprises 60 to 80 wt. % of component B, based on the sum of components A and B.

18. The film according to claim 1, wherein the film has a tensile strength in the dry state in the extrusion direction (MD) of at least 20 MPa, according to EN ISO 527.

19. The film according to claim 1, wherein the film has a tensile strength in the dry state transversely to the extrusion direction (TD) of at least 20 MPa, according to EN ISO 527.

20. The film according to claim 1, wherein the film has an elongation at tear in the dry state in the extrusion direction (MD) of at least 200%, according to EN ISO 527.

21. The film according to claim 1, wherein the film has an elongation at tear in the dry state transversely to the extrusion direction (TD) of at least 200%, according to EN ISO 527.

22. The film according to claim 1, wherein after introduction into salt water, at least 40% of the organic carbon of the film is converted to carbon dioxide within 180 days at 30±2° C., according to the method ASTM D6691-09.

23. The film according to claim 1, wherein after introduction into salt water for a period of 12 weeks under controlled test conditions, according to the method ASTM D6691-09, and after sieving through a sieve having a mesh size of 2.0 mm, the film has a maximum of 20 wt. % of the original dry weight.

24. The film according to claim 1, wherein in active decomposition conditions according to the method DIN EN ISO 14855-1:2012, at least 70% of the organic carbon of the film was converted into carbon dioxide within 180 days.

25. A transport bag comprising the single-layer film according to claim 1.

26. The transport bag according to claim 25, wherein the transport bag is selected from the group consisting of carrier bag, fruit bag, vegetable bag, light T-Shirt bag and ultra-light T-Shirt bag.

27. The transport bag according to claim 25, wherein the transport bag has a weight of 1 to 90 g.

28. A method for producing the single-layer film according to claim 1, the method comprising the following steps:
   a. providing a polymer blend containing component A and component B; and
   b. forming a film from the polymer blend according to step a,
      wherein the method further comprises a coextrusion step and/or a lamination step.

29. A method according to claim 28, wherein the method comprises a coextrusion step.

30. A method according to claim 28, wherein the method comprises a lamination step.

31. A method according to claim 28, wherein the component A has a glass transition temperature (Tg) lower than −40° C.

32. A method according to claim 28, wherein the polymer blend contains 20 to 40 wt. % of the component A, based on the sum of components A and B, and 60 to 80 wt. % of the component B, based on the sum of components A and B.

33. The film according to claim 1, wherein the component B is a combination of poly(3-hydroxybutyrate-co-3-hexanoate) and poly(butylene adipate-co-succinate).

34. The film according to claim 1, wherein the component B includes poly(3-hydroxybutyrate-co-3-hexanoate), and the poly(3-hydroxybutyrate-co-3-hexanoate) has a number-average molecular weight of 200,000 to 1,000,000 g/mol.

35. The film according to claim 1, wherein the component B includes poly(butylene adipate-co-succinate), and wherein the poly(butylene adipate-co-succinate) has a number-average molecular weight of 90,000 to 300,000 g/mol.

36. The film according to claim 1, wherein the component B includes a combination of poly(3-hydroxybutyrate-co-3-hydroxyvalerate) and poly(3-hydroxybutyrate-co-3-hexanoate).

37. The film according to claim 1, wherein the film comprises 25 to 50 wt. % of component A, based on the sum of components A and B.

* * * * *